US006092018A

United States Patent [19]

Puskorius et al.

[11] Patent Number: 6,092,018

[45] Date of Patent: *Jul. 18, 2000

[54] TRAINED NEURAL NETWORK ENGINE IDLE SPEED CONTROL SYSTEM

[75] Inventors: Gintaras Vincent Puskorius, Redford; Lee Albert Feldkamp, Plymouth; Leighton Ira Davis, Ann Arbor, all of Mich.

[73] Assignee: Ford Global Technologies, Inc., Dearborn, Mich.

[ * ] Notice: This patent is subject to a terminal disclaimer.

[21] Appl. No.: 08/597,095

[22] Filed: Feb. 5, 1996

[51] Int. Cl.[7] .............................. G06F 19/00; G06G 7/70

[52] U.S. Cl. ............................ 701/110; 701/102; 706/20; 706/21; 123/339.11; 123/339.23

[58] Field of Search ....................... 364/423.098, 431.07, 364/431.01, 431.03, 431.04, 431.12, 424.058, 431.051, 424.034; 123/416, 492, 693, 339.23, 417, 480, 339.11; 395/22, 905, 911, 913; 701/102, 103, 110; 706/20, 21, 25, 10

[56] References Cited

U.S. PATENT DOCUMENTS

| | | | |
|---|---|---|---|
| 4,506,639 | 3/1985 | Murakami et al. | 123/339.1 |
| 4,625,697 | 12/1986 | Hosaka | 123/478 |
| 4,899,280 | 2/1990 | Onari et al. | 364/431.051 |
| 5,041,976 | 8/1991 | Marko et al. | 364/431.04 |
| 5,048,495 | 9/1991 | Onari et al. | 123/492 |
| 5,050,562 | 9/1991 | Ishii et al. | 364/431.051 |
| 5,099,429 | 3/1992 | Onari et al. | 364/431.051 |
| 5,200,898 | 4/1993 | Yuhara et al. | 701/106 |
| 5,247,445 | 9/1993 | Miyano et al. | 701/115 |
| 5,361,213 | 11/1994 | Fujieda et al. | 701/111 |
| 5,410,477 | 4/1995 | Ishii et al. | 364/431.04 |
| 5,434,783 | 7/1995 | Pal et al. | 701/36 |
| 5,479,573 | 12/1995 | Keeler et al. | 706/21 |
| 5,598,509 | 1/1997 | Takahashi et al. | 706/20 |
| 5,625,750 | 4/1997 | Puskorius et al. | 706/21 |

OTHER PUBLICATIONS

Microsoft Press, "A Division of Microsoft Corporation", p. 110, 1994.

Puskorius et al., "Truncated Backpropagation Through Time and Kalman Filter Training for Neurocontrol," Proceedings of the 1994 IEEE International Conference on Neural Networks, vol. IV,, pp. 2488–2493.

Puskorius et al., "Recurrent Network Training with the Decoupled Extended Kalman Filter Algorithm," Proceedings of the 1992 SPIF Conference on the Science of Artificial Neural Networks, Orlando 1992.

"Automotive Engine Idle Speed Control with Recurrent Neural Networks" by G. V. Puskorius and L. A. Feldkamp, Research Laboratory, Ford Motor Company; In Proceedings of the 1993 American Control Conference; pp. 311 to 316.

Narendra et al, Identification and Controll of Dynamical Systems uisng Neural Networks, IEEE, Mar. 1990.

Narendra et al, Gradient Methods for the Optimization of Dynamical Systems containing Neural Networks, IEEE, Mar. 1991.

Puskorius et al, Neurocontrol of Nonlinear Dynamical Systems with Kalman Filter Trained Recurrent Networks, IEEE, Mar. 1994.

Feldkamp et al, Neural Control Systems Trained by Dynamic Gradient Methods for Automotive Applications, IEEE, Jan. 1992.

*Primary Examiner*—William A. Cuchlinski, Jr.
*Attorney, Agent, or Firm*—Allan J. Lippa; Roger L. May

[57] ABSTRACT

A electronic engine control (EEC) module executes a neural network processing program to control the idle speed of an internal combustion engine by controlling the bypass air (throttle duty cycle) and the engine's ignition timing. The neural network is defined by a unitary data structure which defmes the network architecture, including the number of node layers, the number of nodes per layer, and the interconnections between nodes. To achieve idle speed control, the neural network processes input signals indicating the current operating state of the engine, including engine speed, the intake mass air flow rate, a desired engine speed, engine temperature, and other variables which influence engine speed, including loads imposed by power steering and air conditioning systems. The network definition data structure holds weight values which determine the manner in which network signals, including the input signals, are combined. The network definition data structures are created by a network training system which utilizes an external training processor which employ dynamic gradient methods to derive network weight values in accordance with a cost function which quantitatively defines system objectives and an identification network which is pretined to provide gradient signals representative of the behavior of the physical plant. The training processor executes training cycles asynchronously with the operation of the EEC module in a representative test vehicle.

9 Claims, 5 Drawing Sheets

TRAINED NEURAL NETWORK ENGINE IDLE SPEED CONTROL SYSTEM

FIELD OF THE INVENTION

This invention relates to control systems for use with internal combustion engines and more particularly, although in its broader aspects not exclusively, to systems for controlling the idle speed of an engine.

BACKGROUND OF THE INVENTION

Current approaches to the development of automotive engine controllers are based largely upon analytical models that contain idealizations of engine dynamics as currently understood by automotive engineers. However, automotive engines are complicated systems, and many aspects of their dynamical behaviors are not yet well understood, thereby leading to inexact or incomplete engine models. The dynamics of each engine class varies in detail from one class to another, often resulting in dynamical behaviors that are apparently unique to a given engine class. In addition, model-based approaches to controller strategy development require that the actuators and sensors which form part of the engine system be appropriately characterized and included in the model from which a controller can be analytically synthesized.

Once a control strategy has been designed on the basis of an idealized model, the strategy is then calibrated by adjusting parameters, usually in the form of look-up tables, to achieve a desired performance or behavior. This calibration is usually performed by hand, which can be extremely time consuming considering the number of adjustable parameters (hundreds for idle speed control) that may be potentially adjusted. If the desired performance cannot be achieved via strategy calibration, the engine model is modified, a new or augmented strategy is synthesized, and the calibration for the new strategy is attempted. This cyclic process is repeated until the desired performance is achieved.

SUMMARY OF THE INVENTION

The present invention takes the form of methods and apparatus for the development, training and deployment of neural network systems for controlling the idle speed of an internal combustion engine.

In accordance with the invention, the neural network controller provides throttle control and spark advance commands by executing neural network processing procedures in the background loop of the vehicle's electronic engine control (EEC) system, the commands being produced in response to and as a function of engine state signals that are available to the EEC and weight values established by an automated training procedures. The idle speed neural network controller weight values are developed based on data from an operating vehicle and the development of a detailed dynamical model for synthesizing controller weights is not required. Data defining the engines operation is used by an external training processor which executes concurrently with the execution of the EEC neural network idle speed controller routines. Using a dynamic gradient method, the external training processor generates optimized weight values for the idle speed neural network controller, which are then used in the commercially deployed, trained neural network EEC controller. The training method preferably utilizes a decoupled extended Kalman filter (DEKF) training algorithm or, alternatively, a simpler but possibly less effective gradient descent mechanism.

The principles of the invention are used to develop, train and deploy a neural network control system for regulating the idle speed of a vehicle engine based on measured inputs. These inputs advantageously include engine speed, desired engine speed, engine coolant temperature, mass air flow rate as well as other input vehicle state flag signals which indicate or anticipate engine load disturbances including neutral/drive status, power steering, cooling fan on/off, air conditioning on/off and air conditioning imminent flags. In accordance with an important feature of the neural network calibration method contemplated by the invention, the degree of contribution any given one of such inputs makes to good control for a given vehicle configuration is readily determinable during calibration. Moreover, the neural network calibration system permits new or different input signals (for example, differences caused by the replacement of one sensor type for another) to be readily accommodated.

These and other features and advantages of the present invention will be more clearly understood by considering the following detailed description of a specific embodiment of the invention. In the course of the description to follow, numerous references will be made to the attached drawings.

DESCRIPTION OF THE PREFERRED EMBODIMENT

Figure 1:
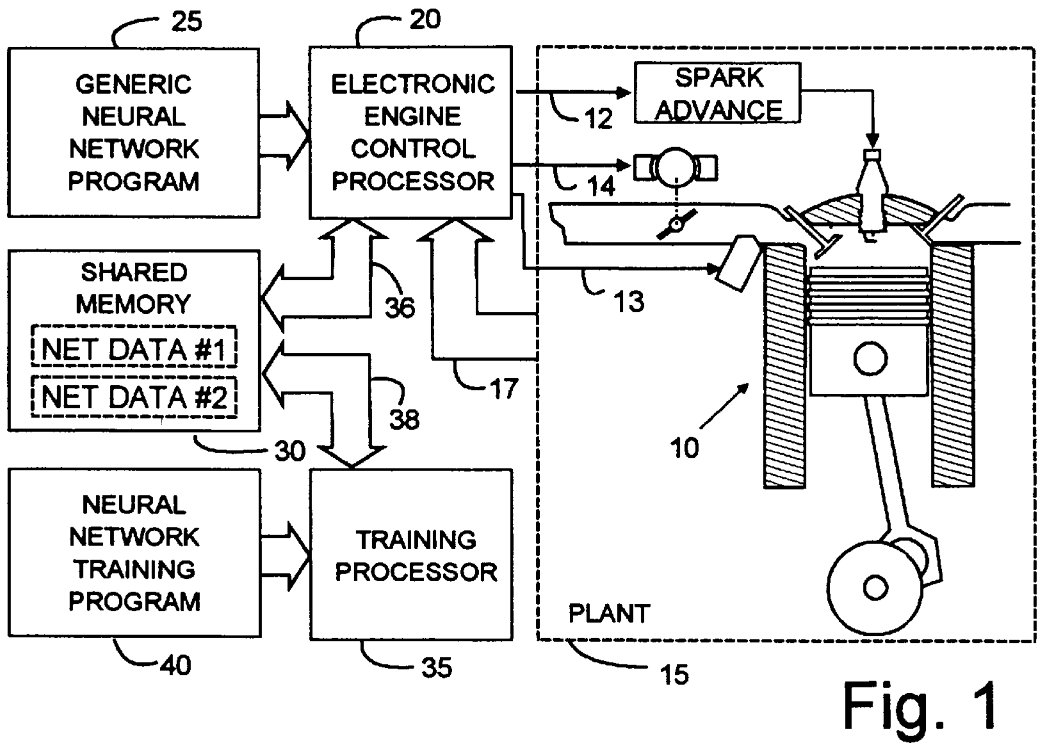
FIG. 1 is a block diagram illustrating the principal components used to develop and calibrate a neural network idle speed control system as contemplated by the invention.

The present invention may be used to advantage to develop, calibrate and deploy neural networks which control the idle speed of an engine in response to sensed inputs. The neural networks are implemented by background processing performed by an electronic engine control (EEC) processing module 20 for controlling a vehicle engine system (plant) 15 as illustrated in FIG. 1. As will be described, the EEC module 20 may advantageously perform a variety of neural network control functions by executing a single generic neural network control program 25 which is responsive to and performs in accordance with network definition and calibration data. The fixed portion of the network data determined during calibration, including data defining the architecture of the network and the trained weights, is stored in a read-only memory (not shown) in a production vehicle, with variable network state data being stored in read/write memory; however, during the prototyping stage, all of the network definition data is instead stored in a read/write shared memory unit 30.

To develop the network definition and calibration data, the generic execution module is interactively coupled to a training processor 35 during the prototyping period, with data being communicated between the two processors via the shared memory 30. FIG. 1 shows the relationship of the main components of the system during the development of a network definition data which defines a neural network for performing engine idle speed control and a second set of network definition data defining a network for performing open loop air/fuel control.

As seen in FIG. 1, the operation of an engine indicated generally at 10 is controlled by command signals 12, 13 and 14 which respectively determine the spark advance, fuel injection rate, and throttle setting for the engine 10. The engine 10 and other relevant vehicle components (not shown) are illustrated in FIG. 1 as forming the physical plant indicated by the dashed rectangle 15. The plant 15 includes sensors and other devices which provide a set of input signals via a bus 17 to the EEC module which generates the spark advance command signal 12, the fuel injection command signal 13, and the throttle control signal 14. The bus 17 carries feed-forward information about the status of the plant, such as coolant temperature, engine load, status flags, etc., as well as feedback information which is responsive to the EEC control output commands, such as engine speed, mass air flow rate, etc.

The EEC module 20 is typically implemented as a microcontroller which executes, among other routines, a generic neural network control program stored in an EEC program memory 25. The generic control program implements any one of several neural networks, including, in accordance with the present invention, a seven node network for idle speed control shown in detail in FIG. 3 and a seven node network for open loop fuel control shown in FIG. 5, to be discussed. In a production vehicle, the EEC program memory 25 would further store fixed network definition data and calibration values or "weights" which define each network in read only memory. In the development system seen in FIG. 1, however, such data for each network is stored in a network definition data structure held in the shared memory unit 30. During the calibration procedure, neural net processing is performed by the EEC module processor 20 while a training algorithm is executed by the external training processor 35. The two processors communicate with one another by reading and manipulating values in the data structures stored in the shared memory unit 30. The EEC processor 20 has read/write access to the shared memory unit 30 via an EEC memory bus 36 while the training processor 35 has read/write access to the unit 30 via a training processor memory bus 38. The shared memory unit 30 includes a direct memory access (DMA) controller, not shown, which permits concurrent access to shared data, including neural network definition data, network weights, EEC input and command output values, etc. by both the EEC processor 20 and the training processor 35.

During normal engine operation, the EEC processor 20 performs engine control functions by executing neural network processing in background routines which process input variables and feedback values in accordance with the network weights in the data structure to produce output command values. During calibration, while a representative vehicle plant 15 is running under the control of the connected EEC module 20, the training processor 35 accesses the EEC input and output values in the shared memory unit to perform training externally while the EEC module is concurrently performing the neural network processing to generate engine control command values. The neural network training processor carries out training cycles asynchronously with the neural network processing performed during EEC background periods. Because the time needed to execute a training cycle typically exceeds the time needed by the EEC module to perform neural network processing, one or more EEC background loops may be executed for each training cycle execution which updates the current neural network weights in response to the previously measured signal values.

Figure 2B:
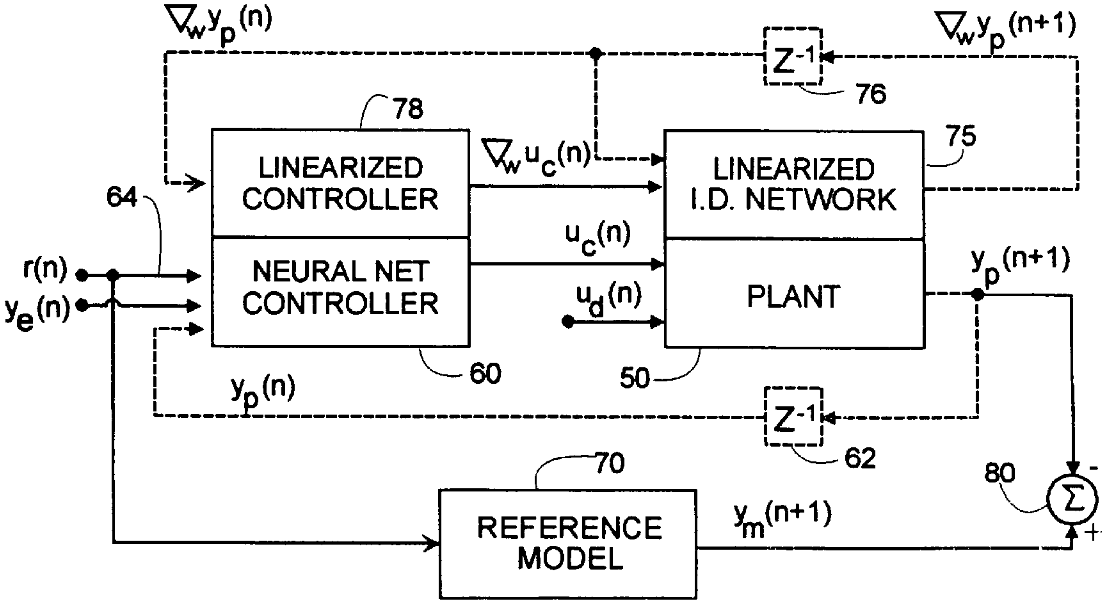
FIGS. 2(*a*) and 2(*b*) are signal flow diagrams which illustrate the underlying methodology used to calibrate a given neural network in accordance with the invention.
Figure 2A:
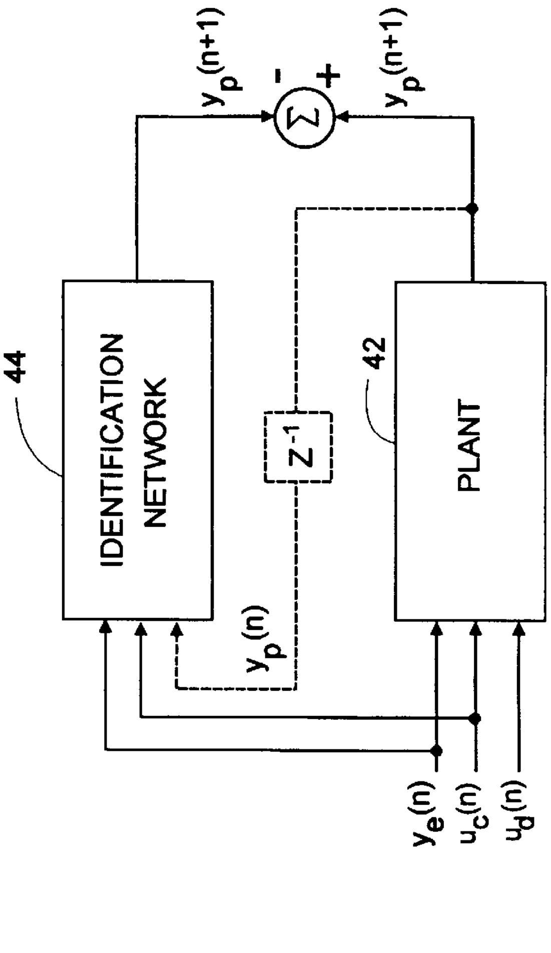

The flow of information during the calibration process is globally illustrated in FIGS. 2(*a*) and 2(*b*) of the drawings. FIG. 2(*a*) shows the manner in which an identification network 44 may be trained by comparing its output to that of a physical plant 42. At a time established by a given processing step n, a generalized physical plant seen at 42 in FIG. 2(*a*), which includes the engine, its actuators and sensors, and the power train and loads which the engine drives, receives as input a set of discrete time control signals $u_i(n)$ along with asynchronously applied unobserved disturbance inputs $u_d(n)$. The state of the physical plant 42 evolves as a function of these two sets of inputs and its internal state. The output of the plant 42, $y_p(n+1)$, is a nonlinear function of its state and is sampled at discrete time intervals. These samples are compared with $y'_p(n+1)$, the output of an identification network 44, which processes the imposed control signals $u_i(n)$ and the time-delayed plant output to generate an estimate of the plant output at the next discrete time step. Typically, the goal for training of the identification network 44 is to modify the identification network such that its output and the plant output match as closely as possible over a wide range of conditions.

To perform idle speed control, the identification network receives as inputs the imposed bypass air (throttle control) signal and spark advance commands to form the control signal $u_i(n)$ vector, along with the measured system output from the previous time step, consisting of the mass air flow and engine speed quantities, making up the vector $y_p(n)$. The output of the identification network would thus be predictions, $y'_p(n+1)$, of engine speed and mass air flow at the following time step.

The signal flow diagram seen in FIG. 2(*b*) illustrates how the gradients necessary for neural network controller training by dynamic gradient methods may be generated using an identification network previously trained as illustrated in FIG. 2(*a*). The plant 50 seen in FIG. 2(*b*) receives as input a set of discrete time control signals $u_c(n)$ along with asynchronously applied unobserved disturbance inputs $u_d(n)$. The plant's output $y_p(n+1)$ is time delayed and fed back to the input of a neural net controller 60 by the delay unit 62. The neural net controller 60 also receives a set of externally specified feedforward reference signals r(n) at input 64.

Ideally, the performance of the neural network controller 60 and the plant 50 should jointly conform to that of an idealized reference model 70 which transforms the reference inputs r(n) (and the internal state of the reference model 70) into a set of desired output signals $y_m(n+1)$.

The controller 60 produces a vector of signals at discrete time step n which is given by the relation:

$$u_c(n)=f_c(x_c(n), y_p(n), r(n), w)$$

where $f_c(.)$ is a function describing the behavior of the neural network controller as a function of its state at time step n, its feedback and feedforward inputs, reference signals, and weight values. The controller output signals $u_c(n)$ at step n are supplied to the plant 50, which is also subjected to external disturbances indicated in FIG. 2 by the signals $u_d(n)$. Together, these influences create an actual plant output at the next step n+1 represented by the signal $y_p(n+1)$.

The desired plant output $y_m(n+1)$ provided by the reference model 70 is compared to the actual plant output $y_p(n+1)$ as indicated at 80 in FIG. 2. The goal of the training mechanism is to vary the weights w which govern the operation of the controller 60 in such a way that the differences (errors) between the actual plant performance and the desired performance approach zero.

The reference model 70, plant 50, and the comparator 80 may be advantageously used to implement a cost function which imbeds information about the desired behavior of the system. Because the leading goal of the neural network for idle speed control is to regulate engine speed to a desired value, a term in the cost function penalizes any deviation of measured engine speed from the desired engine speed. Since a secondary objective is smooth behavior, two additional terms in the cost function, one for each output command, would penalize large changes in control commands between two successive time steps. To maintain a base value for certain controls, the cost function might further penalize deviations from predetermined levels, such as departures in the spark advance from a known desired base value of 18.5 degrees. Additional constraints and desired behaviors can be readily imposed by introducing additional terms into the cost function for the neural network controller being developed.

In order to train a controller implemented as a recurrent neural network during the calibration period, a real time learning process is employed which preferably follows the two-step procedure established by K. S. Narendra and K. Parthasarathy as described in "Identification and Control of Dynamical Systems Using Neural Networks," *IEEE Transactions on Neural Networks* 1, no. 1, pp. 4–27 (1991) and "Gradient Methods for the Optimization of Dynamical Systems Containing Neural Networks", *IEEE Transactions on Neural Networks* 2, No. 2, 252–262 (1991), and extended by G. V. Puskorius and L. A. Feldkamp in "Neurocontrol of Nonlinear Dynamical Systems with Kalman Filter Trained Recurrent Networks," *IEEE Transactions on Neural Networks* 5, no. 2, pp. 274–297 (1994).

The first step in this two step training procedure employs a computational model of the behavior of the physical plant to provide estimates of the differential relationships of plant outputs with respect to plant inputs, prior plant outputs, and prior internal states of the plant. The method for development of this differential model, the identification network, is illustrated in FIG. 2(*a*) and its use for controller training is illustrated in FIG. 2(*b*), where a linearization of the identification network is performed at each discrete time step n for purposes of gradient calculations as elaborated below.

To train the weights of a neural network controller for performing idle speed control, the identification network may take any differentiable form capable of mapping current engine speed (plant state) and the applied throttle and spark advance command values $u_c(n)$ to a prediction of engine speed, part of $y_p(n+1)$, at the next time step. Such an identification network could accordingly take the form of a four-input, two-output neural network. The four inputs are: engine speed, mass air flow rate, bypass air flow rate, and spark advance. The two outputs are predictions of engine speed and mass air flow at the next time step. The identification network weights for such an identification network are determined prior to the controller training process by an off-line procedure during which the vehicle's throttle and spark advance controls are varied through their appropriate ranges while gathering engine speed and mass air flow data. The resulting identification network is then fixed and used for training the neural network weights, as next discussed.

The trained identification network is used in the second step of the training process to provide estimates of the dynamic derivatives (dynamic gradients) of plant output with respect to the trainable neural network controller weights. The gradients with respect to controller weights of the plant outputs, $\nabla_w y_p(n+1)$, are a function of the same gradients from the previous time step, as well as the gradients of the controller outputs with respect to controller weights, $\nabla u_c(n)$, which are themselves a function of $\nabla_w Y_p(n)$ as indicated by the linearized controller 78. These gradients evolve dynamically, as indicated by the counterclockwise signal flow at the top of FIG. 2(*b*), and are evaluated at each time step by a linearization of the identification and controller networks.

The resulting gradients may be used by a simple gradient descent technique to determine the neural network weights as described in the papers by K. S. Narendra and K. Parthasarathy cited above, or alternatively a neural network training algorithm based upon a decoupled extended Kalman filter (DEKF) may be advantageously employed to train both the identification network during off line pre-processing as well as to train the neural network controller during the calibration phase. The application of DEKF techniques to neural network training has been extensively described in the literature, e.g.: L. A. Feldkamp, G. V. Puskorius, L. I. Davis, Jr. and F. Yuan, "Neural Control Systems Trained by Dynamic Gradient Methods for Automotive Applications," *Proceedings of the* 1992 *International Joint Conference on Neural Networks* (Baltimore, 1992); G. V. Puskorius and L. A. Feldkamp, "Truncated Backpropogation Through Time and Kalman Filter Training for Neurocontrol," *Proceedings of the* 1994 *IEEE International Conference on Neural Networks,* vol. IV, pp. 2488–2493; G. V, Puskorius and L. A. Feldkamp, "Recurrent Network Training with the Decoupled Extended Kalman Filter Algorithm," *Proceedings of the* 1992 *SPIE Conference on the Science of Artificial Neural Networks* (Orlando 1992), and G. V. Puskorius and L. A. Feldkamp in "Neurocontrol of Nonlinear Dynamical Systems with Kalman Filter Trained Networks," *IEEE Transactions on Neural Networks* 5, no. 2, pp. 274–297 (1994).

Figure 3:
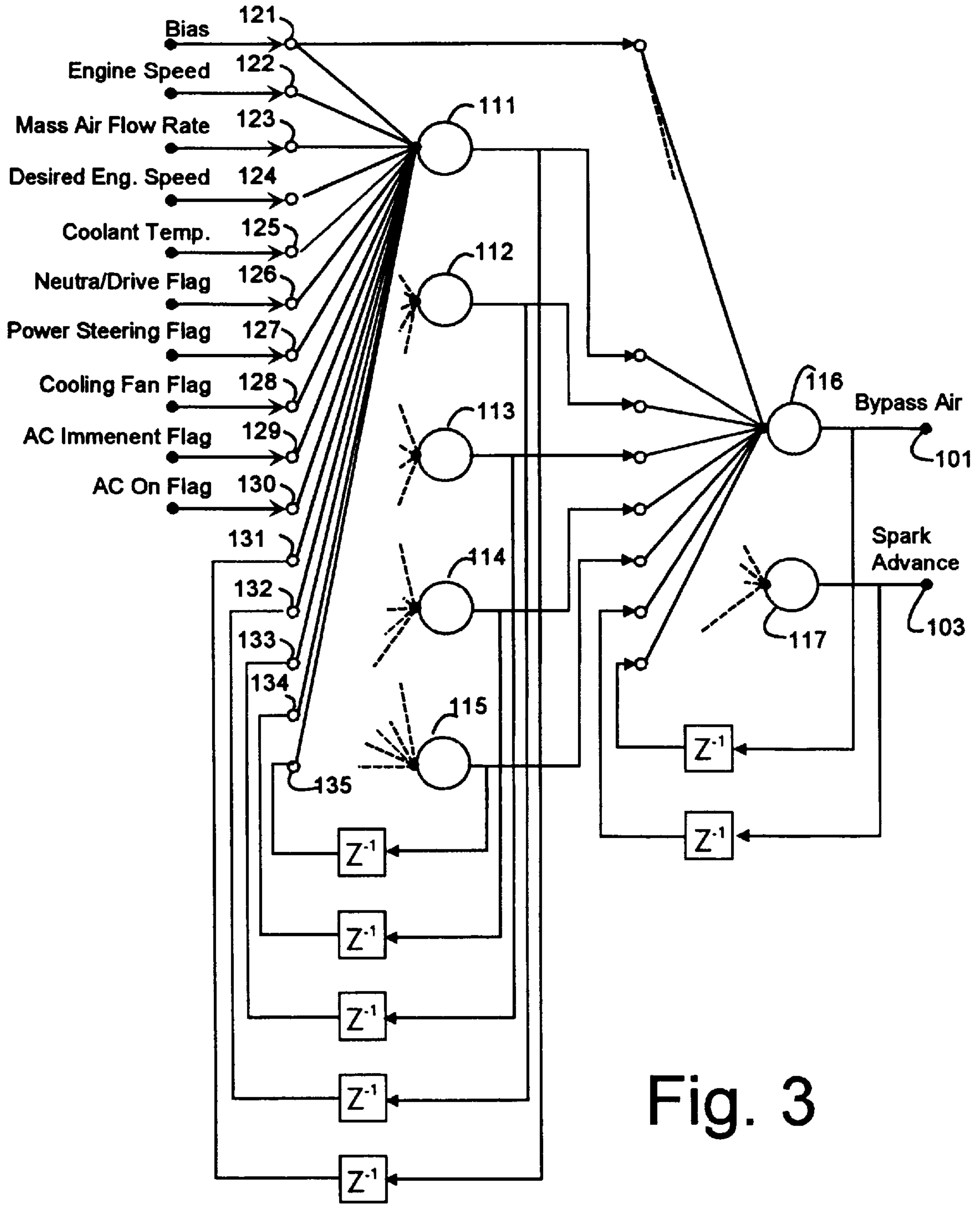
FIG. 3 is a schematic diagram of a representative seven node, one hidden layer recurrent neural network adapted to perform idle speed engine control which can be developed and deployed using the invention.

The use of DEKF to train recurrent neural networks to provide idle speed control is described by G. V. Puskorius and L. A. Feldkamp in "Automotive Engine Idle Speed Control with Recurrent Neural Networks," *Proceedings of the* 1993 *American Control Conference,* pp 311–316(1993), and an example of a neural network architecture for idle speed control is shown in FIG. 3. The output nodes of the network at 101 and 103 respectively provide the bypass air (throttle duty cycle) and spark advance (in degrees) commands. This example architecture has five nodes 111–115 in a hidden layer and two additional output nodes 116 and 117. The seven nodes of this network contain both feedforward connections from the inputs to the network 121–130 as well as five feedback connections per node, indicated at 131–135, which provide time delayed values from the outputs of the five hidden layer nodes.

Not all of nine external inputs 121–130 may be necessary for good control. These inputs include measurable feedback signals such as engine speed 122 and mass air flow 123 that are affected directly by the outputs of the controller. In addition, other inputs, such as the neutral/drive flag 126, the AC imminent flag 129, and the AC on/off flag 130, provide anticipatory and feedforward information to the controller that certain disturbances are imminent or occurring. As the prototyping procedure may reveal, inputs which are found not to be of substantial utility may be discarded, thus simplifying the network architecture.

Figure 4:
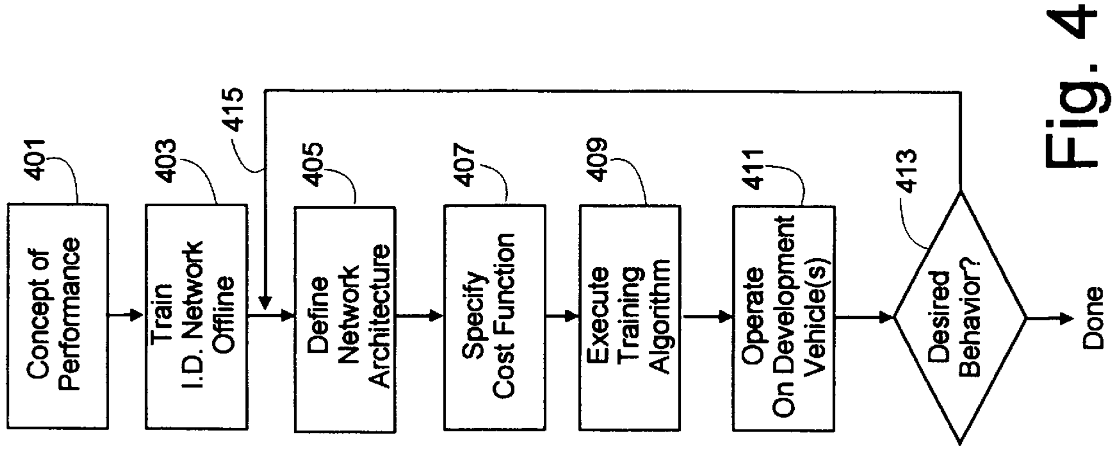
FIG. 4 is a flow chart depicting the overall development procedure followed to develop and deploy a neural network design utilizing the invention.

The overall procedure followed during the calibration process which makes use of the training apparatus described above is illustrated by the overall development cycle flowchart, FIG.4. Before actual training begins, an initial concept of the desired performance must be developed as indicated at 401 to provide the guiding objectives to be followed during the network definition and calibration process. In addition, before the calibration routine can be executed, the identification network (seen at 75 in FIG. 2(*b*)) which models the physical plant's response to controller outputs must be constructed as indicated at 403.

The next step, indicated at 405, requires that the network architecture be defmed; that is, the external signals available to the neural network, the output command values to be generated, and the number and interconnection of the nodes which make up the network must be defmed, subject to later modification based on interim results of the calibration process. The particular network architecture (i.e., the number of layers and the number of nodes within a layer, whether feedback connections are used, node output functions, etc.) are chosen on the basis of computational requirements and limitations as well as on general information concerning the dynamics of the system under consideration. Similarly, the inputs are chosen on the basis of what is believed will lead to good control. Values defining the architecture are then stored in a predetermined format in the network definition data structure for that network. Also, as indicated at 407, before controller training can commence, the desired behavior of the combination of the controller and the physical plant must be quantified in a cost function to operate as the reference model 70 seen in FIG. 2.

A representative vehicle forming the physical plant 15 and equipped with a representative EEC controller 20 is then interconnected with the training processor 35 and the shared memory unit 30 as depicted in FIG. 1. The representative test vehicle is then exercised through an appropriate range of operating conditions relevant to the network being designed as indicated at 411.

Neural network controller training is accomplished by application of dynamic gradient methods. As noted above, a decoupled extended Kalman filter (DEKF) training algorithm is preferably used to perform updates to a neural network controller's weight parameters (for either feedforward or recurrent network architectures). Alternatively, a simpler approach, such as gradient descent can be utilized, although that simpler technique may not be as effective as a DEKF procedure. The derivatives that are necessary for the application of these methods can be computed by the training processor 35 by either a forward method, such as real-time recurrent learning (RTRL) or by an approximate method, such as truncated backprogation through time, as described in the papers cited above. The neural network training program (seen at 40 in FIG. 1) is executed by the training processor 35 to compute derivatives and to execute DEKF and gradient descent weight update procedures, thereby determining progressively updated values for the neural network weights which provide the "best" performance as specified by the predefined cost function.

After training is completed, the performance of the trained controller is assessed as indicated at 413 in FIG. 4. This assessment may be made on the same vehicle used during controller training, or preferably on another vehicle from the same class. If the resulting controller is deemed to be unsatisfactory for any reason, a new round of training is performed under different conditions. The change in conditions could include (1) repeating step 405 to redefine the controller architecture by the removal or addition of controller inputs and outputs, (2) a change in number and organization of nodes and node layers, (3) a change in the cost function or its weighting factors by repeating step 407, or (4) a combination of such changes. For example, in the development of the seven node network seen in FIG. 3, it was found that training a neural network controller with only bypass air as an output variable (with constant spark advance) produced control that was inferior to controlling bypass air and spark advance simultaneously.

Using the prototyping arrangement methods and apparatus which have been described, it has been found that controller training can be carried out quite rapidly, typically in less than one hour of real time. When trained as discussed above, the idle speed neural network of FIG. 3, for example, proved to be extremely effective at providing prompt spark advance and steady bypass air in the face of both anticipated and unmeasured disturbances, providing idle mode performance which was substantially superior to that achieved by the vehicle's production strategy, as developed and calibrated by traditional means.

Figure 5:
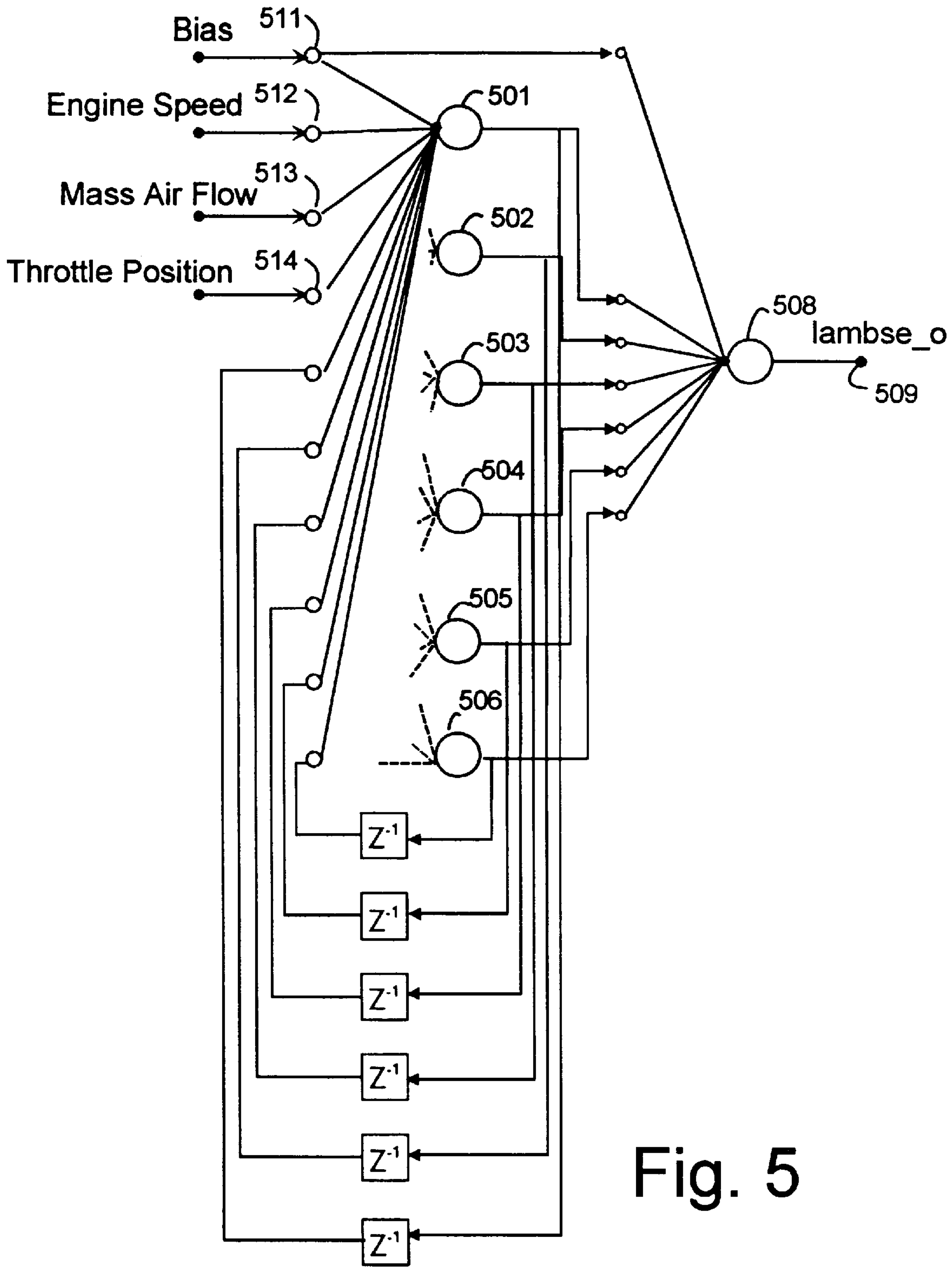
FIG. 5 is a schematic diagram of a representative seven node, one hidden layer neural network for providing open loop transient air/fuel ratio control which can similarly be developed and deployed using the invention.

The generic neural network execution module which executes in the EEC 20 may also be used to implement other neural network engine control functions, as illustrated by the neural network seen in FIG. 5 which provides open loop transient air fuel control. The network of FIG. 5 determines the value of lambse_o, an open loop signal value used to control the base fuel delivery rate to the engine (as modified by a closed loop signal produced by a conventional proportional-integral-derivative (PID) closed loop mechanism which responds to exhaust gas oxygen levels to hold the air fuel mixture at stoichiometry). The open-loop control signal lambse_o produced by the neural network of FIG. 5 determines the fuel delivery rate as a function of four input signals applied at the networks inputs: a bias signal 511, an engine speed value 512, a mass air flow rate value 513, and a throttle position value 514. The architecture of the network of FIG. 5 employs six nodes 501–506 in a single hidden layer, all of which are connected by weighted input connections to each of the four input connections 511–514 and to six signal feedback inputs, each of which is connected to receive the time delayed output signals representing the output states of the six nodes 501–506 during the prior time step.

As in the case of the idle speed control network, the open loop air fuel control network of FIG. 5 is trained with the aid of an identification network developed by off-line calculations to represent the engine's open loop response to the four input quantities: fuel command, engine speed, mass air flow rate and throttle position. In addition to the identification network, the training algorithm employs a cost function which specifies desired performance characteristics: deviations in air/fuel ratio from the desired stoichiometric value of 14.6 are penalized, as are large changes in the open loop control signals to encourage smooth performance. The cost function establishes the relative importance of these two goals by relative cost function coefficients.

In the production vehicle, a single generic neural network execution module implements both networks by accessing two different network definition data structures, one containing all of the network specific information for the idle speed control network and the second containing all information needed to implement the open loop air/fuel control neural network.

Figure 6:
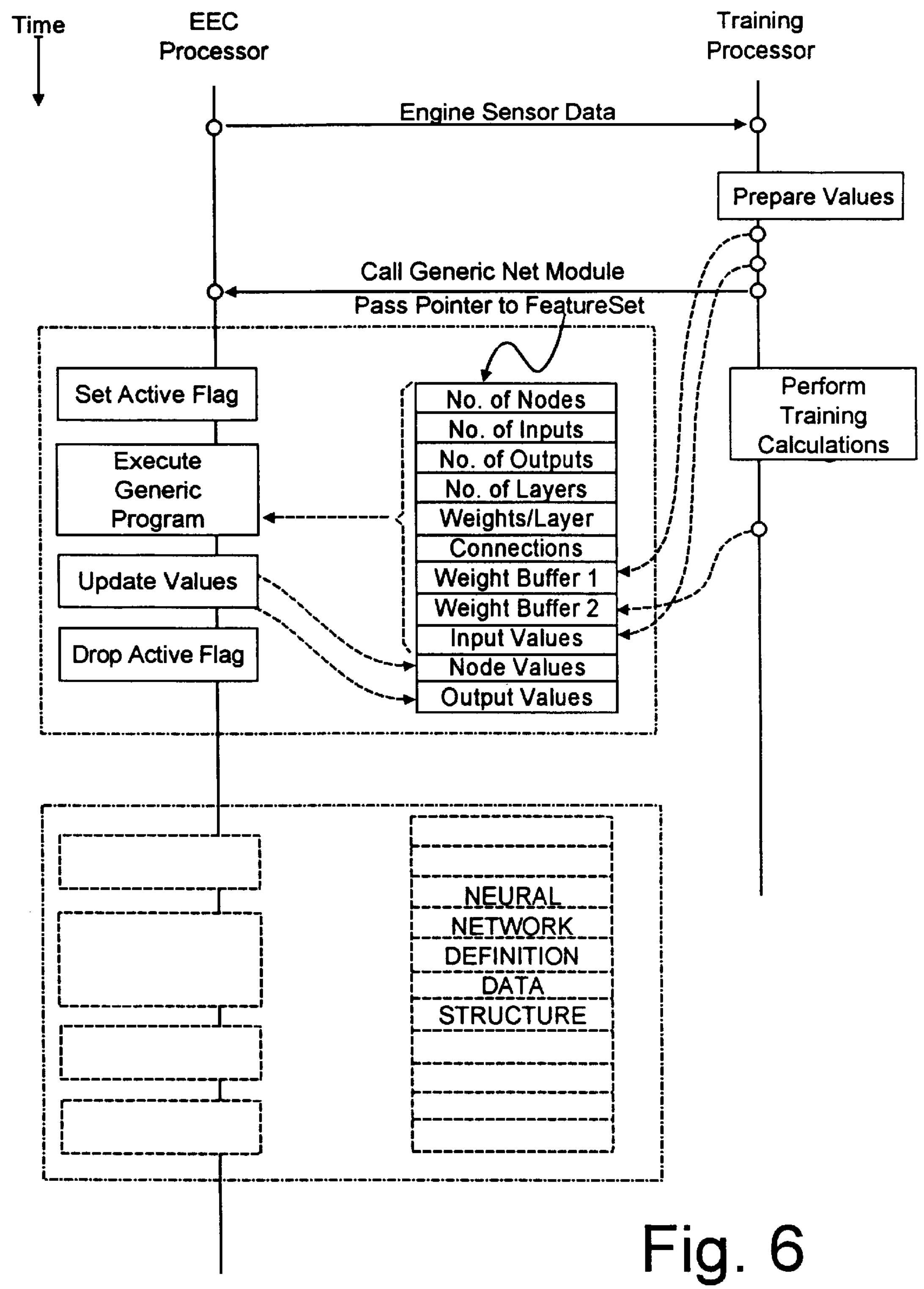
FIG. 6 is a timing and execution flow diagram depicting the manner in which the generic network execution module executes asynchronously with the training processor.

FIG. 6 illustrates the manner in which the generic neural network execution module implemented by the EEC processor operates cooperatively and asynchronously with the training processor during calibration. In the diagram, events which occur first are shown at the top of the chart, processing steps executed by the EEC module are shown at the left and steps executed by the external training processor are shown at the right. Data exchanges between the two processors take place via the shared memory unit and largely, although not exclusively, via the network definition data structures which are accessible to both processors. In FIG. 6, two such network definition structures for two different networks are illustrated at 601 and 602. As seen in detail for the data structure 601, each holds information in memory cells at predetermined offsets from the beginning address for the structure, and the stored information includes data fully defining the network architecture, including the number, organization and weighted interconnections of the network nodes. The network definition structure further stores current network state information including input and output values for the network, as well as current output values for each node (which are needed by the training processor during calibration). The weights themselves are stored in a double buffering arrangement consisting of two storage areas seen at 611 and 612 in FIG. 6, discussed later.

The generic execution module is implemented as (one or more) subroutines callable as a background procedure during the normal operation of a deployed vehicle. In the training mode, the generic execution module is initiated by informing the training processor at 620 (by posting a flag to the shared memory) that the EEC mainline program has entered a background state and is available to perform neural network processing. The training processor then obtains engine sensor data at 622 and prepares that data in a proper format for use by the training algorithm and by the generic execution module at 624. If it has not already done so, the training module then loads initial network weights into the first weight buffer 611 as indicated at 625. The initial weight values may be selected by conventional (untrained) strategies. Zero weight values may be used for those networks which are not yet trained, with the EEC processor performing processing on these zero values to emulate normal timing, with the resulting controls being replaced by useful control values as computed by conventional production strategies and then replaced by optimized values during training.

With suitable weights in the data structure 601, either from production values or from prior training cycles, the training processor then loads the network input values to be processed by the neural network into the data structure 601 as indicated at step 630.

At step 650, the training processor makes a subroutine call to the generic execution module subroutine which will be performed by the EEC module, passing a pointer to the data structure 601 and thereby making all of the information it contains available to the subroutine which begins execution at 660 as seen in FIG. 6.

The generic neural net routine first sets an active flag at 670 which, as long as it continues to be set, indicates that neural net processing of the definition data 601 is underway. The training processor, which may be concurrently executing the training algorithm is accordingly informed that values other than the values in the inactive double buffer weight storage area should not be altered. Similarly, during identification network calibration, the operating neural network weights may be zero valued as the EEC module performs the generic neural network processing to emulate normal timing.

The generic neural network processing then proceeds at step 680, utilizing the network definition data and weights, along with the current input values, to produce the output signals which, at the conclusion of neural network processing, are stored at step 690 in the data structure 601, updating both the output signals (which are available to the EEC for conventional control processing) and the internal network output node values for use by the training algorithm. The subroutine indicates successful completion by dropping the active flag at 620, thereby advising the training processor that the values in the network definition data structure 601 are available for use during the next training cycle.

As indicated at 700 in FIG. 6, the generic neural network execution model, when supplied with a different network definition data structure 701, is capable of implementing an entirely different neural network function. Thus, a single generic control program can implement both the control network of FIG. 3 for performing idle speed control and, in the same background loop but in another subroutine call, implement the open loop air fuel control network of FIG. 5. Moreover, both networks can be trained using the same automated test procedure apparatus. Because the neural network is entirely defined by configuration data in the network definition data structure, modifications to the architecture or the calibration of any given network occurs entirely in software without requiring any change to the generic execution module hardware or firmware.

It is to be understood that the embodiment of the invention which has been described is merely illustrative of the principles of the invention. Numerous modifications may be made to the apparatus and methods which have been described without departing from the true spirit and scope of the invention.

What is claimed is:

1. Apparatus for controlling the idle speed of an internal combustion engine, said engine including an ignition timing control and a throttle, said apparatus comprising, in combination:

sensing means coupled to said engine for producing a plurality of input signal values, each of which is indicative of a corresponding one of a plurality of engine operation conditions, said conditions including engine speed and the rate at which intake air is being delivered to said engine.

data storage means for storing a neural network definition data structure which defines a neural network, said structure including:

signal value data defining said input signal values and the values of signals being processed by said neural network, and weight values governing the manner in which signals are combined within said neural network, and processing means consisting of an electronic engine control microprocessor and program storage means for storing instructions executable by said processor, said processing means including:

means responsive to said signal value data in said data structure for performing a generic neural network routine for combining selected signal values to produce and store new signal values in said data structure in accordance with said weight values in said data structure, output means coupled to said throttle and responsive to one or more of said now signal values for controlling the speed of said engine, second output means coupled to said ignition timing control and responsive to one or more of said new signals for generating, a second output signal for controlling the ignition timing of said engine, and an independently operating training processor external to said electronic engine control microprocessor.

2. Apparatus as set forth in claim 1 wherein at least a portion said data storage means a sharable memory coupled to and accessible by both said electronic engine control microprocessor and said training processor.

3. Apparatus as set forth in claim 2 further including second program storage means for storing a training program executable by said training processor for monitoring the changes in the data stored in said definition data structure during the operation of said engine and said electronic engine control microprocessor for modify said weight values in said data structure.

4. Apparatus for developing a neural network for controlling the idle speed of an internal combustion engine, said apparatus comprising, in combination:

sensing means coupled to said engine for producing a plurality of input signal values, each of which is indicative of one of a plurality of particular engine operation conditions including engine speed and the rate at which intake air is delivered to said engine, data storage means for storing a neural network definition data structure, said structure including:

data defining the values of signals being processed by said neural network, and weight values governing the manner in which signals are combined within said neural network, program storage means for storing instructions executable by said electronic engine control microprocessor, said instructions including a generic neural network routine for combining at least selected ones of said input signal values to produce and store new signal values in said particular data structure in accordance with said weight values in said particular data structure, a training processor external to and operating independently of said electronic engine control microprocessor, said training processor being coupled to said data storage means and including means for monitoring changes in the values stored in a selected one of said data structures, and means for altering the values of weight values stored in said data structure to alter the new signal values produced within said structure by the operation of said neural network routine, output means responsive to one or more of said new signal values for generating a first output signal, and a throttle responsive to said output signal for controlling the speed of said engine.

5. Apparatus as set forth in claim 4 wherein said means for altering said weight values comprises determining the dynamic gradient of said weight values with respect to changes in the operating speed of a representative test engine subjected to a range of typical operating conditions.

6. The method of training a neural network to control the idle speed of an internal combustion engine, said neural network being implemented by an electronic engine control processor connected to receive input signal values indicative of the operating speed of said engine and the rate at which intake air is being delivered to said engine, and being further connected to supply output signals to control the speed of said engine, said method comprising the steps of:

interconnecting an external training processor to said electronic engine control processor such that said external training processor can access said input signal values, generating and storing a data structure consisting of an initial set of neural network weight values, operating a representative internal combustion engine and its connected electronic engine control processor over a range of operating conditions, concurrently with the operation of said engine, executing a generic neural network control program on said electronic engine control processor to process said input signal values into output control values in accordance with the values stored in said data structures, concurrently with the operation of said engine, varying said output signals in accordance with said output control values to control the operation of said engine, concurrently with the operation of said engine, executing a neural network training program on said external training processor to progressively alter at least selected ones of said neural network weight values in said data structure to modify the results produced during the execution of said neural network training program, evaluating the operation of said engine to indicate deviations in the operating speed of said engine from a desired idle speed is achieved, and utilizing the values in said data structure determined to minimize said deviations to control the execution of said neural network control program on said EEC to control production engines corresponding to said representative engine.

7. The method set forth in claim 6 wherein said step of interconnecting an external training processor to said electronic engine control processor such that said external training processor can access said input signal values consists of the step of coupling a shared memory device for storing said data structure to both said training processor and electronic engine control processor such that information within said data structure can be manipulated independently by both said training processor and said electronic engine control processor.

8. The method as set forth in claim 6 wherein said step of executing a neural network training program on said external training processor to progressively alter at least selected ones of said neural network weight values means includes the step of determining the dynamic gradient of said selected weight values with respect to changes in the operating speed of a representative test engine subjected to a range of typical operating conditions.

9. The method as set forth in claim 6 wherein said step of executing a neural network training program on said external training processor to progressively alter at least selected ones of said neural network weight values means includes the step of determining the dynamic gradient of said selected weight values with respect to changes in the operating speed and in the throttle duty cycle of a representative test engine subjected to a range of typical operating conditions.

* * * * *